June 25, 1963  F. J. SCHMIDT  3,094,795
ELECTRIC-HYDRAULIC DREDGE
Filed Aug. 7, 1961  6 Sheets-Sheet 1
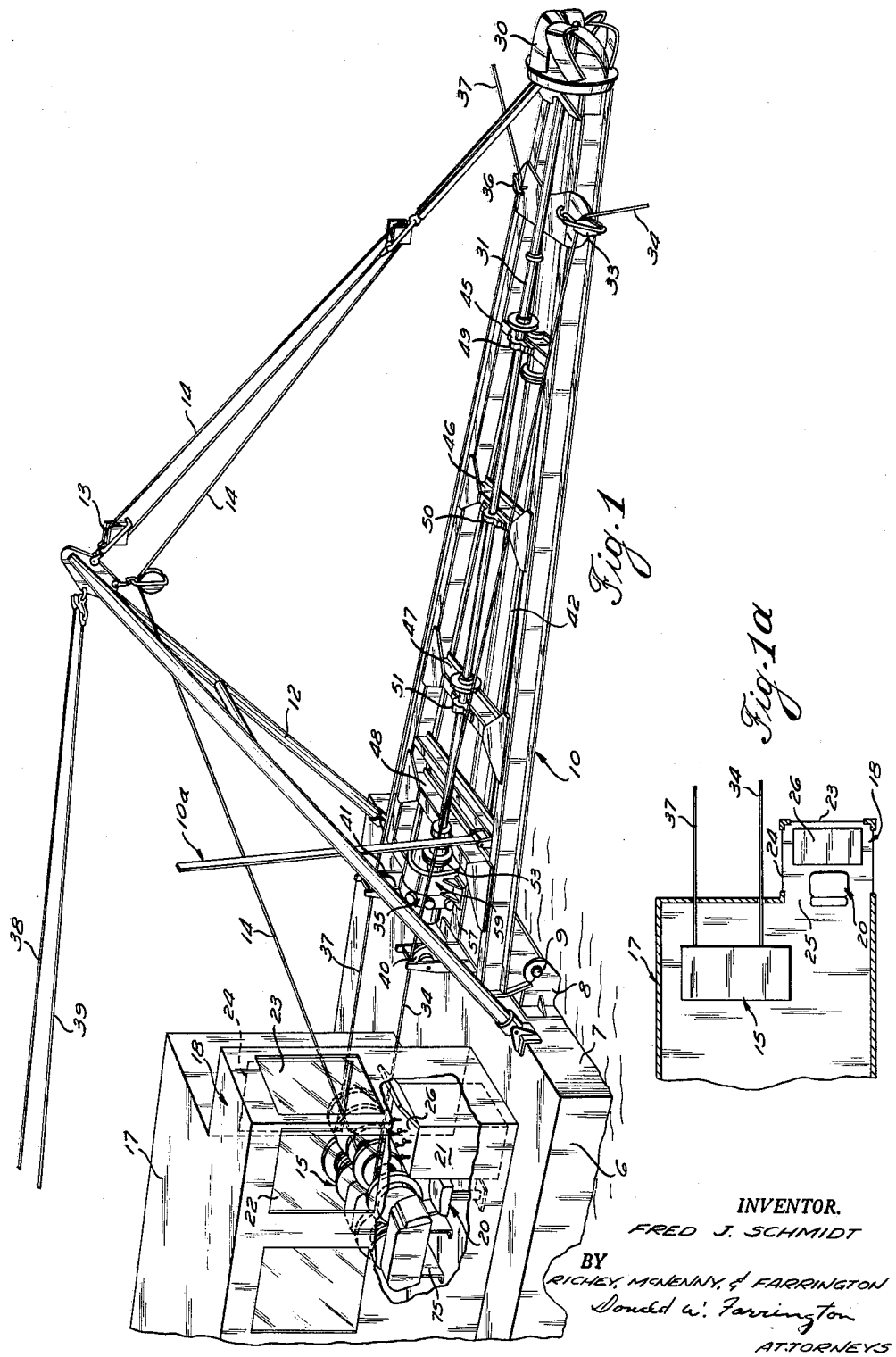
INVENTOR.
FRED J. SCHMIDT
BY RICHEY, McNENNY, & FARRINGTON
Donald W. Farrington
ATTORNEYS

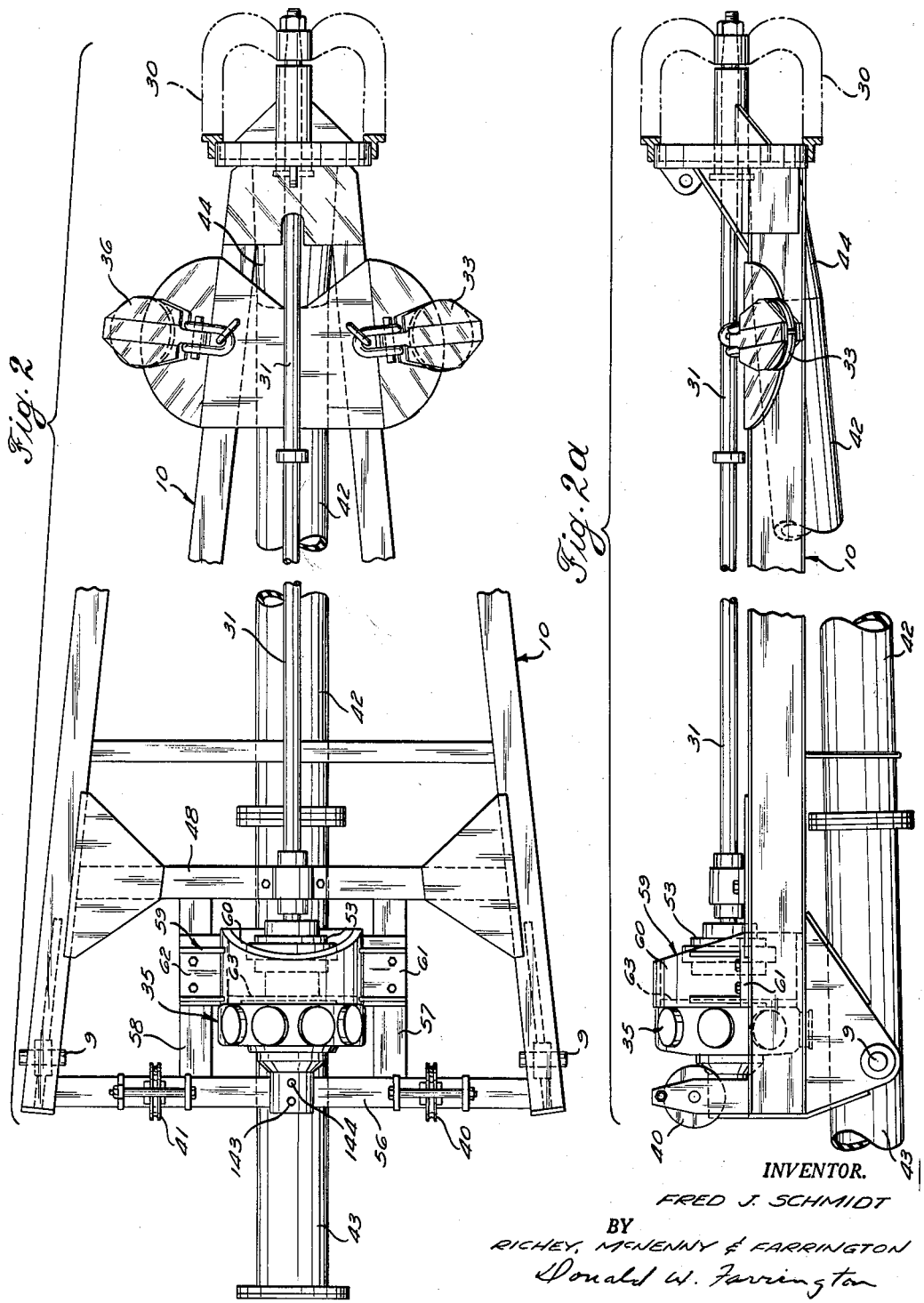

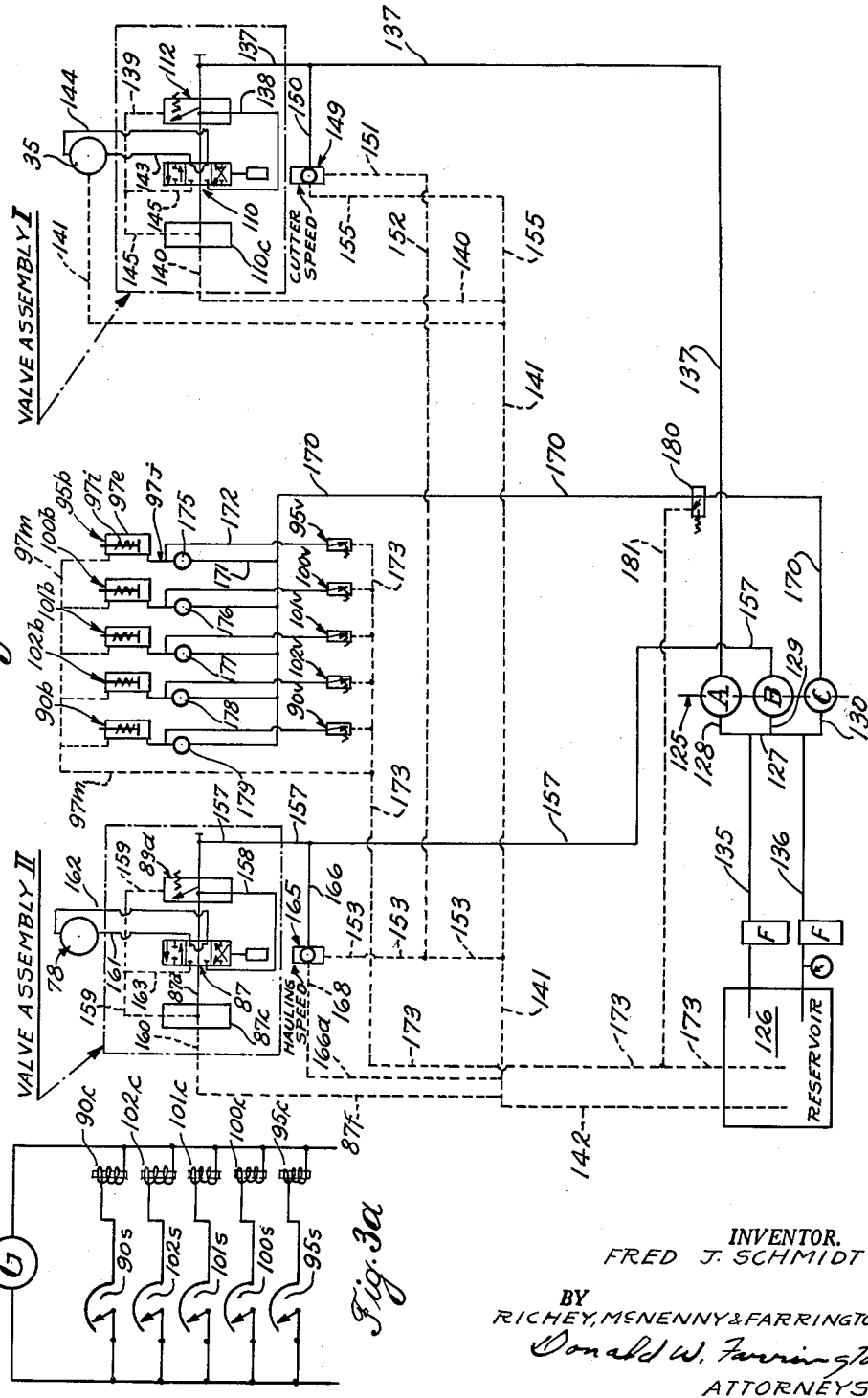

June 25, 1963   F. J. SCHMIDT   3,094,795
ELECTRIC-HYDRAULIC DREDGE
Filed Aug. 7, 1961   6 Sheets-Sheet 4
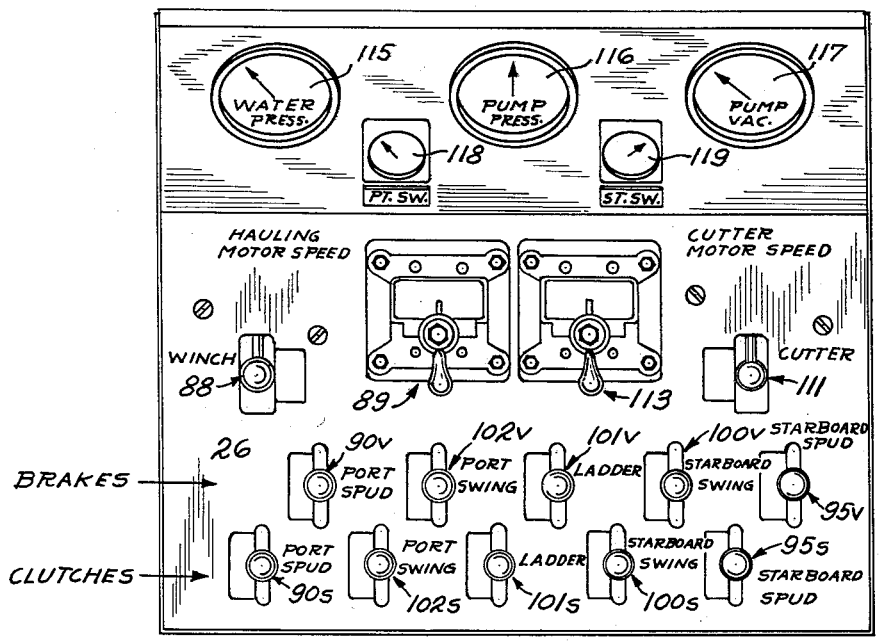
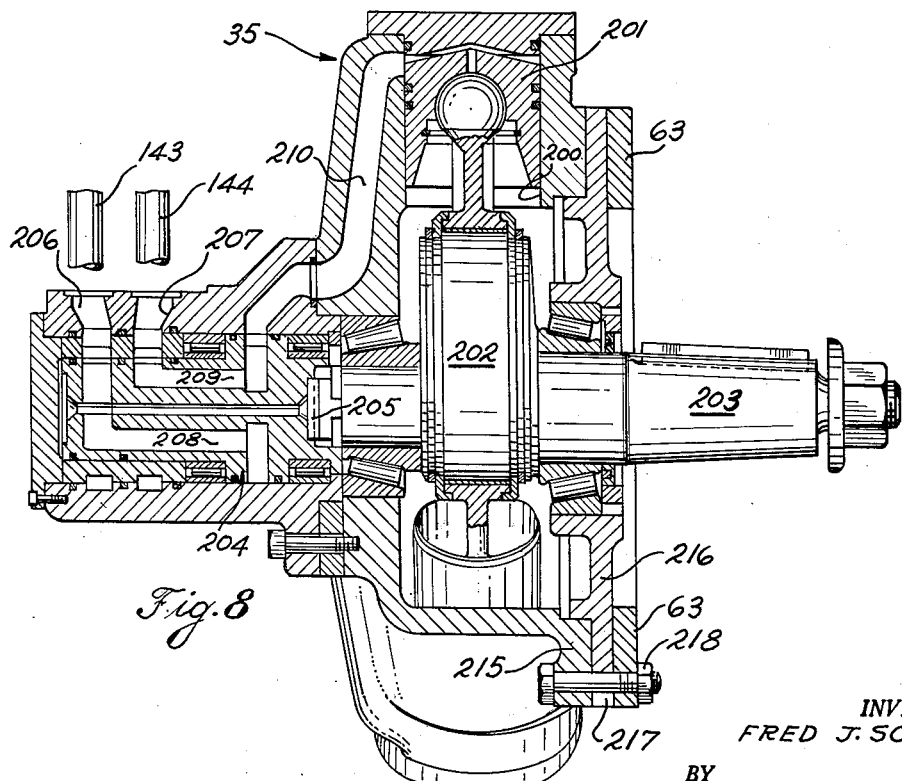
INVENTOR.
FRED J. SCHMIDT
BY
RICHEY, McNENNY & FARRINGTON
Donald W. Farrington
ATTORNEYS June 25, 1963 F. J. SCHMIDT 3,094,795
ELECTRIC-HYDRAULIC DREDGE
Filed Aug. 7, 1961 6 Sheets-Sheet 5

INVENTOR.
FRED J. SCHMIDT
BY
RICHEY, McNENNY & FARRINGTON
Donald W. Farrington
ATTORNEYS

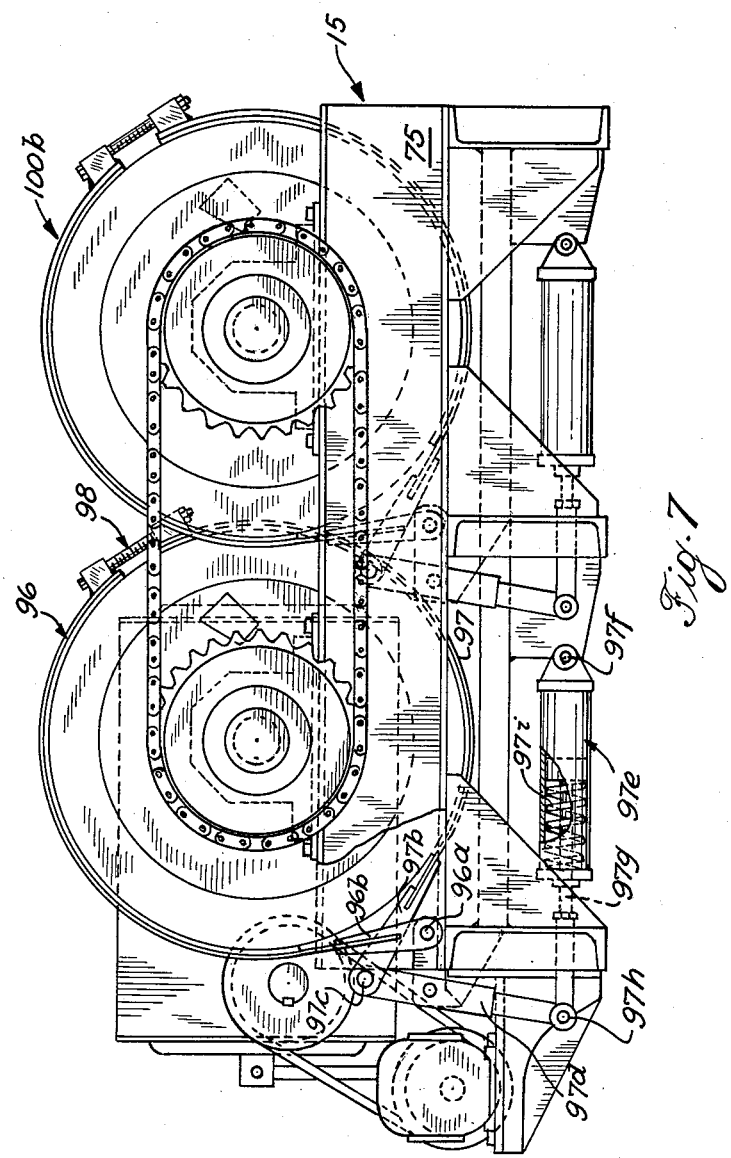

# United States Patent Office 3,094,795
Patented June 25, 1963

3,094,795
ELECTRIC-HYDRAULIC DREDGE
Fred J. Schmidt, Catonsville, Md., assignor to Ellicott Machine Corporation, Baltimore, Md., a corporation of Maryland
Filed Aug. 7, 1961, Ser. No. 129,764
10 Claims. (Cl. 37—67)

This invention relates to dredges and more particularly to an improved hydraulic system and controls for operating the dredge.

It is among the objects of the present invention to provide a dredge having a hydraulic system including hydraulic motor means for driving a rotary cutter and hydraulic motor means for driving the hauling machinery constructed and arranged to provide efficient one-man operation of the dredging equipment.

It is a further object of the invention to provide a dredge according to the preceding object wherein a central control unit for all of the dredging operations is arranged to provide for maximum visibility and convenience for the dredge operator.

It is a further object of the invention to provide a dredge according to the preceding objects wherein the central control unit is mounted on the dredge forwardly of the hauling machinery and at one side of the center line of the dredge ladder whereby the dredge operator may observe the operation of the hauling machinery and, at the same time, the operator is provided with an unobstructed view forwardly and at each side of the dredge ladder.

It is a further object of the invention to provide a dredge according to the preceding objects wherein the hydraulic motor for the cutter is mounted on the ladder and is arranged to directly drive the cutter shaft and the motor is characterized by variable speed high torque operations under the control of the dredge operator.

It is a further object of the invention to provide a dredge according to the preceding object wherein the hydraulic system includes a plurality of synchronously driven pumps and the output of a first pump is directed to the hydraulic motor for the hauling machinery and the output of a second pump is directed to the hydraulic brakes for the hauling machinery and the output of a third pump is directed to the motor for driving the cutter.

It is a further object of the invention to provide a dredge according to the preceding objects wherein the hauling machinery is characterized by electric clutch operation and wherein the speed control for the hauling machinery and the hydraulic brake control for the hauling machinery and the cutter motor speed control are carried by a central unit forwardly of the hauling machinery.

It is a further object of the invention to provide a hydraulic system including a plurality of pumps having different output characteristics constructed and arranged to efficiently drive the cutter motor, the hauling machinery motor and the hydraulic brakes for the hauling machinery.

Further objects and advantages relating to improvements in visibility and convenience for the dredge operator, accuracy in the control of the dredge operations, ruggedness of construction and economy in operation will appear from the following description and the appended drawings wherein:

FIG. 1 is a perspective view with parts broken away of a dredge made according to the present invention;

FIG. 1a is a diagrammatic plan view showing an L-shaped deck house for the dredge with the operator's compartment forwardly of the hauling machinery;

FIG. 2 is a plan view with parts broken away showing the ladder and cutter drive mechanism for the dredge;

FIG. 2a is an elevation with parts broken away of the ladder and cutter drive for the dredge;

FIG. 3 is a diagrammatic showing of the hydraulic system for operating the component parts of a dredge made according to the present invention;

FIG. 3a is a wiring diagram for the electric clutch circuit;

FIG. 4 is a plan view of the central control panel carried in the operator's compartment for controlling the actuation of different components of the dredge;

FIG. 7 is an end elevation showing the hydraulic brake mechanism provided for restraining the winch drum rotation; and FIG. 8 is an elevation with parts in section showing the hydraulic motor for driving the dredge cutter.

Figure 5:
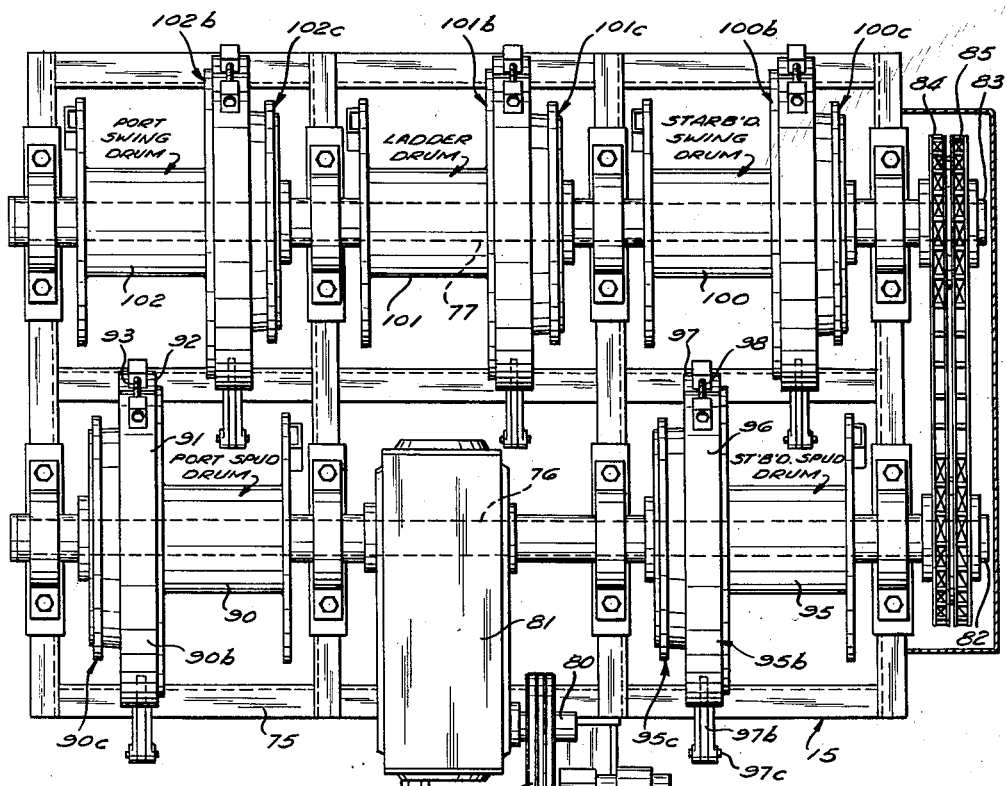
FIG. 5 is a plan view of the hauling machinery made according to the present invention.
Figure 6:
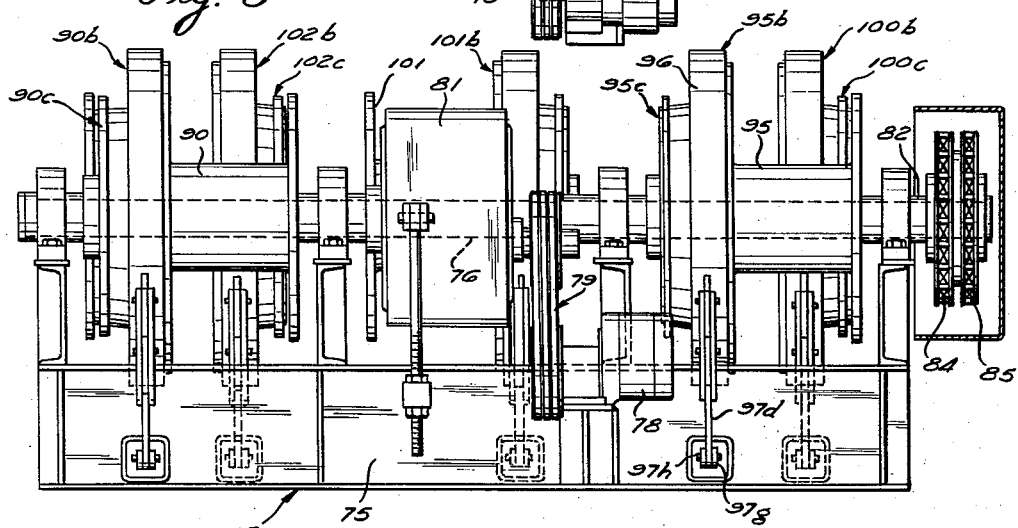
FIG. 6 is an elevation of the hauling machinery showing the hydraulic motor drive means for rotating the winch shafts of the hauling machinery.

Referring to the drawings, the hull 6 illustrated is rectangular and the hull may be constructed in sections to facilitate the portability of the dredge as described in U.S. Patents Nos. 2,731,741 and 2,944,352, owned by the assignee of the instant application.

The forward wall 7 of the dredge hull is provided with a bracket assembly 8 to support the horizontal pivot 9 for the dredge ladder indicated in its entirety as at 10. An A-frame 12 is mounted on the hull and the upper end of the A-frame supports the pulley 13 forming a part of the mechanism for raising and lowering the ladder by means of cable 14. The ladder is raised by winding cable 14 on a ladder drum forming a part of the hauling machinery which is indicated in its entirety as at 15. Preferably the hull 6 is provided with a deck house 17 having a forward compartment 18 at one side of the center line of the dredge and dredge ladder 10. The forward compartment 18 may be referred to as the operator's compartment and includes a seat 20 for the operator and the control stand 21 which supports on panel 26 the electric and hydraulic controls to be manipulated by the operator. Windows, such as 22, 23 and 24, are provided in the forward compartment 18 so that the operator has an unobstructed view at each side of the dredge and forwardly of the dredge. The rear side of the compartment 18 is open, as indicated at 25 in FIG. 1a, so that the operator, while seated at the control panel 26, may observe all of the drums in the hauling machinery assembly 15.

The dredge ladder 10 is provided with a rotary cutter 30 driven by cutter shaft 31 carried on a series of transverse members 45—48 forming a part of the dredge ladder. The shaft 31 is arranged to be driven by the hydraulic motor indicated in its entirety as at 35. The outer end of the dredge ladder 10 is provided with a starboard pulley 33 at one side to guide anchor cable 34. A similar port pulley 36 is carried at the outer end of the dredge ladder to guide anchor cable 37. The anchor cables 34 and 37 are also guided by pulleys 40 and 41 carried at the rear end of the dredge ladder. The anchor cables 34 and 37 extend through an opening in the forward wall of the deck house and are secured to swing drums forming a part of the hauling machinery assembly 15.

The operator, while seated at 20 in he operator's compartment, may observe the condition of the anchor cables 34 and 37 and also may observe the movement of the swing drums in the hauling machinery 15 which are utilized to move the cables 34 and 37. Supporting cables 39 and 38 secured at the apex of the A-frame 12 extend rearwardly therefrom to a spud frame (not shown) at the rear of the hull.

It will be understood that a pair of conventional vertically moving spuds (not shown) are mounted at the rear of the hull and that such spuds are raised and lowered by means of cables running through the hull to the hauling machinery 15.

A suction pipe 42 is carried at the underside of the dredge ladder 10 and the suction pipe 42 preferably includes a flexible hose section 43 in that area adjacent the ladder pivot 9 to accommodate the pivotal movements of the ladder. The suction pipe 42 is provided with a suction mouth 44 which opens to the interior of the cutter 30 and material being dredged and cut loose by the cutter 30 is drawn into the suction mouth 44 and through the suction pipe 42 to the suction pump carried by the dredge. The design of the power unit and suction pump are not critical to the present invention and the showing of the power unit and suction pump have been omitted for clarity.

The transverse ladder members 45, 46, 47 and 48 span the longitudinal side members of the ladder 10 and the transverse members 45—47 carry bearing blocks 49, 50 and 51, respectively, for the cutter shaft 31. A flexible coupling 53 is provided to couple the shaft 31 with the hydraulic drive motor 35.

The side members of the dredge ladder 10 are connected to each other adjacent the pivoted end of the ladder by a cross-member 56 and spaced longitudinally extending supports 57 and 58 are connected to the transverse members 56 and 48, respectively. A motor support indicated in its entirety as at 59 includes a semi-cylindrical portion 60 which is welded to side brackets 61 and 62 carried by the members 57 and 58, respectively. The member 60 surrounds the coupling 53 and carries an annular motor support ring 63 adjacent the forward face of the motor 35.

The hauling machinery, which has been indicated in its entirety as at 15, comprises a rectangular frame 75 which supports in spaced journal boxes a spud shaft 76 and a swing and ladder shaft 77 in spaced parallel relation. The power unit for the hauling machinery preferably comprises a hydraulic motor 78 which, by means of V-belts 79, drives the input shaft 80 of the reducer 81. The spud shaft 76 represents the output shaft of the reducer 81 and one end of the shaft 76 is proportioned to extend beyond the hauling machinery frame 75 as at 82.

The swing and ladder shaft 77 is similarly projected beyond the frame as at 83 and chains 84 and 85 transmit the drive from the spud shaft 76 to the ladder and swing shaft 77 by means of chain sprockets mounted on the shaft extensions.

The hydraulic motor 78 is reversible in direction by means of the reversing valve indicated in the hydraulic diagram of FIG. 3 as at 87. The reversing valve 87 position is determined by the manual control 88 located on the central control panel 26. The hydraulic circuit to the power unit 78 driving the hauling machinery also includes a speed control valve indicated at 89 on the central control panel of FIG. 4 and diagrammatically at 165 in the hydraulic circuit of FIG. 3. The operator selects the directional rotation of the hauling machinery motor 78 by manipulation of the manual control 88 and thereafter selects the rotational speed of the motor 78 by means of the manual control 89.

The port spud drum 90 of the hauling machinery is provided with a brake 90b and an electric clutch 90c. The electric clutch 90c is controlled at the central control panel 26 by means of the manual switch 90s. The rotation of the port spud drum 90 may be arrested by operation of the hydraulic brake valve 90v located on the central control panel 26.

As will be described hereinafter, each of the drums in the hauling machinery assembly 15 is equipped with an electric clutch controllable by the operator and a hydraulic brake also controllable by the operator at the central control panel 26. The preferred form of electric clutch employed in the present invention includes friction surfaces which are brought together into clutching engagement by means of electro-magnetic coils. As shown in the wiring diagram of FIG. 3A, the amount or degree of frictional engagement is dependent upon the current directed to the coils by way of the switches which include variable resistance rheostats. The switches indicated at 90s, 95s and 100—102s are carried on the central control panel and are positioned so as to manually vary the rheostat resistance by the dredge operator.

Referring to the clutches in the hauling machinery, the clutch 90c for the port spud drum 90 is keyed or otherwise fixed to the spud shaft 76 and upon the operator moving the switch 90s, the electric clutch engages with a complementary friction surface on the port spud drum 90 and thus the drum is turned in response to the rotation of the shaft 76. The operator, by increasing the resistance in the switch, may slip the friction clutch to vary the amount of engagement as required.

The ladder is lowered by gravity when the ladder drum 101 unwinds the cable 14. The ladder is equipped with a depth gauge indicated at 10a which is provided with indicia showing the operator the digging depth of the cutter 30 when the cutter is submerged.

The hydraulic brake 90b for the port spud drum 90 includes a semi-circular brake band 91 adjustably connected to a semi-circular brake band 92 by the adjustment means 93 so as to encircle the brake drum carried by the port spud drum.

The starboard spud drum 95 is similarly provided with a brake 95b and an electric clutch assembly 95c. The starboard spud clutch switch is controlled by manual lever 95s carried at the right-hand side of the central control panel 26. Similarly, the starboard spud drum brake 95b is controlled at the central control panel 26 by the valve indicated at 95v.

Referring to FIG. 7, the two semi-circular bands 96 and 97 surrounding the starboard spud drum 95 are shown. The two bands are connected to each other by means of a brake adjustment device 98. One end of the band 96 is anchored at pivot pin 96a carried by the frame 75 of the hauling machinery. The anchoring fixture 96b is preferably slotted and the free end of the band 97 carries a fixture 97b which extends through the slot and is pivoted at 97c to a brake lever 97d. Hydraulic brake cylinder 97e is pivotally anchored at 97f to the hauling machinery frame 75. The hydraulic brake cylinder 97e carries a piston and the piston rod 97g is connected at 97h to the lower end of the brake lever 97d.

Each of the various drums mounted in the hauling machinery is provided with a brake assembly which is controlled by the operator at the control panel 26. The brake cylinders are illustrated diagrammatically in FIG. 3 and one of the brake cylinders 97e for the starboard spud drum brake 95b is shown in FIG. 7. Each brake assembly is provided with a heavy duty spring such as 97i which is normally effective to tighten the brake bands 96 and 97. When, however, hydraulic fluid is introduced to the brake cylinder 97e, the bias of the spring 97i is overcome and the piston rod 97g is moved in a direction so as to release the brake bands 96 and 97. Accordingly it will be understood that in the event of failure of hydraulic fluid pressure in the brake system, the brakes will be held in the applied or "on" position and thus prevent rotation of the drums.

The starboard swing drum 100 is provided with a clutch 100c and a brake 100b. The ladder drum 101 and the port swing drum 102 are each provided with electric clutches and hydraulic brakes corresponding to that described in detail in connection with the starboard spud drum 95. The hydraulic brake for the starboard swing drum 100 is operated by the valve 100v on the central control panel 26. Similarly, the ladder drum brake is operated by the valve 101v on the central control panel. The port swing drum 102 is similarly controlled by the brake valve 102v and the clutch switch 102s on the central control panel. The ladder drum is clutched and de-clutched by means of the ladder switch 101s and the starboard swing drum 100 is clutched and de-clutched by the starboard swing switch 100s.

The electric power for the clutch actuation is preferably provided with a generator indicated at G in FIG. 3a. The coils, indicated at 90c, 95c, 100c, 101c and 102c, represent the actuating coils for the electric clutches as indicated. The series of switches 90s, 95s, 100s, 101s and 102s indicate the switches having corresponding numbers on the central control panel 26.

The directional rotation of the cutter motor 35 is determined by the reversing valve 110 which valve 110 is manually controlled by the lever 111 on the central control panel. The rotational speed of the cutter motor 35 is varied by valve 149 which is manually controlled as at 113 on the central control panel 26. By manipulation of the control 111 the operator selects the appropriate directional rotation to be established through the valve 110 and thereafter the rotational speed may be varied by manipulation of the handle 113 which operates valve 149.

Preferably the control panel is provided with dial indicators such as 115 showing service water pressure, 116 showing pressure developed in the main suction pump and 117 indicating the suction pump vacuum. A dial indicator as at 118 indicates the effective clutch engagement for port swinging and 119 the effective clutch engagement for starboard swinging.

In connection with the hydraulic system for the dredge, a gear pump of the type diagrammatically illustrated in FIG. 3 is preferred. Preferably the gear pump is driven by the main power unit such as a Diesel engine of the dredge and the driven shaft of the gear pump is indicated in the diagram of FIG. 3 as at 125. A first pair of gears indicated at A provides the hydraulic output for the cutter motor 35. On a 10-inch dredge the gear pump A would be designed to provide an output of about 40 gallons per minute at a pressure of 1600 pounds per square inch. The intermediate pump B would be designed to provide the hydraulic output for operating the hauling machinery motor 78 and would provide an output of about 14.6 gallons per minute at 1400 pounds per square inch. The smaller of the three gear pumps, as indicated at C, is utilized for the actuation of the hauling machinery hydraulic brakes. On the hauling machinery in a dredge of the size indicated, namely a 10-inch dredge, the gear pump C would have an output of about 10 gallons per minute at 300 pounds per square inch.

A common reservoir 126 is provided for the spent oil returning to the pumps. A common manifold as at 127 provides inlet 128 for the large pump A, 129 for the intermediate pump B and 130 for the smaller pump C.

Filters F are inserted in lines 135 and 136 connecting the reservoir 126 to the manifold 127 so as to insure clean hydraulic fluid in the operating components.

The hydraulic system for operating the cutter motor 35 includes a line 137 connected to the output side of the pump A. A control line 150 leads from the line 137 to the valve 149 which controls the cutter speed. The positioning of the valve 149 is determined at the operator's panel 26 and manipulation of the control handle 113 on the panel 26 determines the amount of hydraulic fluid which may move from the pump A to the cutter motor or, alternatively, to be by-passed through line 155 back to the reservoir.

A line 155 leads from the cutter speed control valve 149 to line 141 and line 142 and thence back to the reservoir 126. With the cutter motor speed control 113 in the "Reduced Speed" position, the valve 149 is about half open and thus about half of the entire output of the pump A is merely recirculated through line 137, thence through line 150 and thence into line 155 leading to the reservoir 126. As the operator moves the control handle at 113 to "Normal Speed" position to interrupt the by-pass flow, the entire pump A output is directed by way of line 137 to the valve assembly I indicated in FIG. 3. The valve assembly I includes a relief valve section 112, a reversing valve section 110 and an exit section 110c.

The relief valve 112 is normally closed and fluid from the pump output A enters by way of line 137, thence through line 138 to the reversing valve section 110.

The reversing valve 110 may have either of three positions and such positions are controlled by the handle 111 at the control panel 26. Assuming the reversing valve section 110 is in the neutral position, fluid flow from line 138 exits through line 145 and thence through section 110c to line 140 which terminates in the reservoir 126. Movement of the lever 111 to either side of the neutral position will direct the fluid flow out of the reversing valve through either line 143 or line 144. Assuming that the pump output is being directed out of the reversing valve 110 through line 143, the motor 35 will be turning in one direction and the spent oil will go back to the reversing valve section 110 through the line 144. Spent oil exits from the reversing valve through line 145 to the exit section 110c and thence out by way of line 140 to the reservoir 126.

Movement of the reversing valve control 111 in an opposite direction will send the fluid out of the reversing valve to the motor 35 by way of line 144. Under such conditions the spent oil from the motor 35 re-enters the reversing valve by way of line 143 and thence exits by way of line 145 and to line 140 leading to the reservoir 126.

The motor 35 is provided with a drain line 141 which discharges fluid that may leak past the motor pistons into line 155 going back to the reservoir 126. The cutter speed control valve 149 is also provided with a drain line 151 which discharges into line 153 and thence back to the reservoir 126.

In the event of a predetermined overload or resistance to turning of the cutter motor 35, the high fluid pressure developed in the relief valve section 112 will open the valve 112 and thus relieve the high fluid pressure by way of line 139 which goes to the exit section by way of line 145 and thence through line 140 and back to the reservoir 126.

Referring to the hydraulic system for the hauling machinery, the output of pump B is directed through line 157 to a valve assembly II which is similar to the valve assembly I described above in connection with the cutter motor 35. A control line 166 leads from the output line 157 to a valve 165 which controls the speed of the hauling machinery motor 78. Preferably the hauling machinery motor 78 is a gear type motor.

The valve 165 is controlled at a location indicated at 89 on the control panel 26. When the valve 165 is at "Reduced Speed" position, about one-half of the output of pump B is by-passed through the valve 165, thence through line 168 and 166a to line 141 and line 142 leading to the reservoir 126. When, however, the control lever at 89 on the control panel is moved to "Normal Speed" position so as to close off the by-pass through valve 165, the entire pump output of pump B flows up through line 157 to the valve assembly II. When the valve 165 is in the "Normal Speed" position so that there is no flow to the line 168, then the entire pump output from pump B is directed to the valve assembly II. The motor speeds of both cutter motor 35 and hauling motor 78 may vary between "Reduced Speed" and "Normal Speed."

The valve assembly II includes a relief valve section indicated at 89a, a reversing valve section indicated at 87 and an exit section indicated at 87c. The relief valve 89a is normally closed and the flow is conducted through line 159 to the reversing valve 87. The operation of the reversing valve 87 corresponds substantially to the operation described in connection with the reversing valve 110 for the cutter motor 35.

It will be understood that hydraulic fluid from the reversing valve 87 may be directed to the hauling motor 78 through either line 161 or line 162 and that when one of said lines is pressurized, the other line functions as a return line for the spent fluid. When the reversing valve is in a neutral position the pressurized fluid is discharged at 87d and thence through exit section 87c and back to the reservoir by way of line 87f.

In the event of an overload or predetermined resistance to drive in the hauling machinery motor 78, the resulting high pressure will open the relief valve 89 and thus incoming fluid from the pump B will be by-passed around the reversing valve by way of line 159.

The hauling speed control valve 165 is provided with a drain line 153 terminating in line 141 which leads back to the reservoir 126.

The motor 78 is preferably of the fixed displacement gear type and is provided with a line 161 going to the reversing valve and a second line 162 going to the reversing valve. Either of the lines 161 or 162 may serve as inlet or outlet for the pump 78 depending upon the position of the reversing valve 87. The spent oil conducted to the reversing valve 87 is discharged therefrom by way of line 163 which is connected to line 159 and thence by way of line 160 to lines 141 and 142 leading to the reservoir 126.

The small pump C is provided with output line 170 leading to the hydraulic brake cylinders for the hauling machinery. Referring to the hydraulic brake cylinder 97e, which is arranged to operate the starboard spud drum brake, line 171 leads to the brake cylinder inlet 97j. A line 172 leads from the brake cylinder inlet 97j to the normally open valve 95v. As long as the valve 95v remains open, fluid from the small pump output line 170 flows through the circuit 171—172 and thence to the discharge line 173 which terminates in the reservoir 126. When, however, the valve 95v is closed, hydraulic fluid in line 171 is constrained to flow into the brake cylinder 97e from line 170 and thus moves the piston to overcome the bias of spring 97i. The piston movement described will release the friction brake band 96 so as to allow motion of the starboard spud drum 95. Each of the hydraulic cylinders is illustrated in the diagrammatic showing of FIG. 3 as being in the brake-applied position. The springs, such as 97i, are expanded to apply the frictional brake bands. When fluid is admitted into the cylinder 97e, as above described, the bias of the spring 97i is overcome and the brake is released. Each of the hydraulic brake cylinders is provided with a drain line which terminates in a drain line manifold indicated at 97m. The drain line manifold 97m empties into return line 173 which leads to the reservoir 126.

A flow control valve 175 is inserted in the line 171 and is preferably designed to limit the flow into the hydraulic brake cylinder to about 1½ gallons per minute. Similar flow control valves 176, 177, 178 and 179 are inserted in the input lines leading to the other hydraulic cylinders shown in the diagram. The flow control valves 175—179 limiting the flow to the individual cylinders insures that sufficient volume of fluid is available for actuation of the hydraulic cylinders individually or jointly.

A pressure relief valve 180 is inserted in the line 170 leading to the hydraulic brake cylinders. The relief valve 180 is normally closed as indicated in the diagram and would be opened against the bias of a spring in the event the line pressure in conduit 170 should exceed about 300 pounds per square inch. The relief flow from valve 180 would be by way of line 181 leading to line 173 and thence to the reservoir 126.

To provide for high torque operation of the cutter and, at the same time, to provide for widely varying cutter speeds, the hydraulic motor 35 is preferably of the type illustrated in FIG. 8. The motor body is provided with a plurality of radially arranged cylinders 200 and pistons 201 are arranged to drive the eccentric 202 on the crankshaft 203. A rotary valve, indicated in its entirety as at 204, is operatively connected as at 205 to the crankshaft 203 and rotates therewith. Pump inlet 206 is connected to the input line 143 and the pump outlet 207 is connected to the discharge line 144. Passageways formed in the rotary valve member 204 as at 208 and 209 direct the fluid in timed relation to the movement of the pistons 201 within the cylinders 200.

A passageway such as, for example, the passageway 210 in the motor body serves to conduct fluid under high pressure from passageway 208 into the top of the cylinder 200 causing the piston to move to the bottom of its stroke and driving the eccentric 202. In the position shown in FIG. 8, the piston 201 is approaching the top of its stroke and thus spent hydraulic fluid is being exhausted from the cylinder 200 to the outlet line 144.

The pump body is provided with a web portion indicated at 215 which web portion is between adjacent cylinders formed in the body. An end cap for the body is indicated at 216 and the flange 217 of the end cap is apertured so as to be aligned with apertures in the web 215. Bolts 218 extending through the web 215 and through the flange 217 anchor the motor to the supporting ring 63 that is carried by the dredge ladder.

In operating the dredge made according to the present invention, the hull 6 of the dredge is swung from side to side using one of the spuds as a pivot for the swinging movement. A starboard anchor is connected to the cable 34 and a port anchor is connected to the cable 37. The cables 34 and 37 are connected to the starboard swing drum and the port swing drum, respectively. The connections with the drums are at opposite sides of the drums so that as the starboard drum rotates to pull in on cable 34, the cable 37 is being unwound from the port drum 102.

Normally the cutter 30 is rotated in a clockwise direction and is pulled against the material to be dredged. The ladder 10 is lowered by gravity against the work and may be maintained at a predetermined angle by means of the cable 14 and the ladder drum 10.

The dredge operator within the compartment 18 is in a position to observe the condition of the anchor cables 34 and 37 employed for swinging the dredge and is also in a position to observe the operation of the cutter. The operator's location is such that whenever he manipulates any of the controls at the central control panel, he may observe the resulting reaction of the component being operated. All of the operations may be conveniently performed by one man and the construction and arrangement of the parts is such that such operations are more accurately controlled and more efficiently carried out than with the dredges of the prior art.

Although I have shown and described one form of my invention in considerable detail, it will be appreciated by those skilled in the art that numerous variations may be made therein without departing from the scope of the invention as defined in the following claims:

What is claimed is:

1. A dredge comprising a hull having a deck, hauling machinery mounted on said deck, said hauling machinery comprising a frame having a pair of spaced parallel shafts mounted for rotation on the frame, a plurality of drums mounted on each of said shafts, hydraulic motor means to drive said shafts, an electric clutch for each drum adapted to clutch said drum to the shaft on which it is mounted, each of said drums having a brake drum carried thereby, a brake band surrounding said brake drum, spring means to contract said brake band, hydraulic cylinder and piston means to release the brake band, an operator's control panel mounted on said deck spaced from said hauling machinery, said operator's control panel having switches for selectively operating said electric clutches, and control valves for operating said brakes.

2. A dredge comprising a hull having a deck, hauling machinery mounted on said deck, said hauling machinery comprising a frame having first and second spaced parallel transverse shafts mounted for rotation on the frame, chain and sprocket means to drive the second shaft from the first, a plurality of drums mounted on each of said shafts, hydraulic motor means to drive said first shaft, an electric clutch adapted to selectively clutch each drum to the shaft on which it is mounted, each of said drums having a brake drum carried thereby, a brake band surrounding said brake drum, spring means to contract said brake band, hydraulic cylinder and piston means for each brake band to release the brake band, an operator's control panel mounted on said deck, said control panel being spaced laterally and forwardly with respect to said hauling machinery, said operator's control panel having switches for selectively operating said electric clutches, and control valves for operating said drum brakes.

3. A dredge having a dredge ladder, a rotary cutter carried by said dredge ladder, a hydraulic motor mounted on the ladder to drive said cutter, said dredge having hauling machinery including a pair of swing drums, a pair of spud drums and a ladder drum, a hydraulic motor for driving said drums, hydraulic brake means for said drums, a first, second and third hydraulic pump, a reservoir providing fluid for the inlet of each pump, the output of said first pump being connected to said cutter motor, the output of said second pump being connected to said hauling machinery motor and the output of said third pump being connected to said hydraulic brake means, a central control panel, controls carried by said panel for selecting the directional rotation of said cutter motor and said hauling machinery motor and for varying the speed of said motors and for directing fluid to said hydraulic brake means.

4. A dredge having a dredge ladder, a rotary cutter carried by said dredge ladder, a hydraulic motor mounted on the ladder to drive said cutter, said dredge having hauling machinery including a pair of swing drums, a pair of spud drums and a ladder drum, a hydraulic motor for driving said drums, hydraulic brake means for said drums, a power unit, a first, second and third pump driven by said power unit, said first pump having an output volume exceeding the output volume of the second pump, a reservoir providing fluid for the inlet of each pump, the output of said first pump being connected to said cutter motor, the output of said second pump exceeding the output of the third pump in volume and being connected to said hauling machinery motor and the output of said third pump being connected to said hydraulic brake means, a central control panel, controls carried by said panel for selecting the directional rotation of said cutter motor and said hauling machinery motor and for varying the speed of said motors and for directing fluid to said hydraulic brake means.

5. A dredge having a hull, a ladder pivotally mounted on said hull for swinging movement about a horizontal axis, a cutter carried by the outer free end of the ladder, hauling machinery for raising and lowering the ladder and for swinging the dredge, said hauling machinery comprising a frame mounted on the deck of the dredge, a shaft journalled for rotation on said frame, a pair of swing drums and a ladder drum rotatably mounted on said shaft, electric clutch means adapted to selectively couple said drums to the shaft for rotation thereby, each of said drums having a brake drum, a frictional brake band arranged to surround said brake drum, one end of said brake band being pivotally anchored to said frame, a rocking lever pivoted on the frame, the other end of said brake band being connected to one end of said rocking lever, a hydraulic cylinder carried by said frame, said hydraulic cylinder having a piston and piston rod, said piston rod being operatively connected to said rocking lever, spring means to bias the piston rod in one direction and thereby contract the brake band, hydraulic fluid means to bias the piston and piston rod in an opposite direction to release said brake band, an operator's central control panel carried by the dredge between said hauling machinery and said dredge ladder, said control panel being offset with respect to the center line of the dredge, said control panel having switches for controlling said electric clutch means and valves for controlling said hydraulic brake cylinders.

6. A dredge having a hull, a ladder pivotally mounted on said hull for swinging movement about a horizontal axis, a cutter carried by the outer free end of the ladder, a motor for driving the cutter mounted on the ladder, hauling machinery for raising and lowering the ladder, for swinging the dredge and raising dredge spuds, said hauling machinery comprising a frame mounted on the deck of the dredge, a pair of spaced shafts journalled for rotation on said frame, a motor for driving said shafts, a pair of swinging drums and a ladder drum rotatably mounted on one of said shafts, a pair of spud drums on the other of said shafts, electric clutch means adapted to selectively couple said drums to the shaft on which it is mounted for rotation thereby, each of said drums having a brake drum, a frictional brake band arranged to surround said brake drum, one end of said brake band being pivotally anchored to said frame, a rocking lever pivoted on the frame, the other end of said brake band being connected to one end of said rocking lever, a hydraulic cylinder carried by said frame, said hydraulic cylinder having a piston and piston rod, said piston rod being operatively connected to said rocking lever, spring means to bias the piston rod in one direction and thereby contract the brake band, hydraulic fluid means to bias the piston and piston rod in an opposite direction to release said brake band, an operator's central control panel carried by the dredge between said hauling machinery and said dredge ladder, said control panel being offset with respect to the center line of the dredge, said control panel having switches for controlling said hydraulic clutches, valves for controlling said hydraulic brakes and speed controls for said motors.

7. A dredge comprising a hull, a deck for said hull, a ladder bracket mounted at one end of said hull, a dredge ladder pivotally carried by said bracket for swinging movement about a horizontal axis, a rotary cutter mounted at the outer free end of said dredge ladder, a drive shaft for the cutter mounted at the upper side of the dredge ladder, a motor support ring carried by the dredge ladder adjacent the pivotal axis of the dredge ladder, a hydraulic motor mounted on said support ring, said hydraulic motor having an output shaft aligned with said cutter drive shaft, said motor having a plurality of radially arranged cylinders, said motor having a cylindrical valve housing at that side thereof opposite the cutter drive shaft, a rotary valve mounted in said cylindrical housing coupled to said motor output shaft for rotation therewith, a fluid inlet and fluid outlet connected to said cylindrical housing to alternatively fill and empty said motor cylinders in timed relation to said rotary valve movement and thereby directly drive said cutter.

8. A dredge comprising a hull, said hull having a deck, a ladder bracket mounted at one end of said hull, a dredge ladder pivotally carried by said bracket for swinging movement about a horizontal axis, said ladder comprising converging longitudinal members and transverse struts, a rotary cutter mounted at the outer free end of said dredge ladder, a cutter drive shaft mounted on said struts at the upper side of the dredge ladder, a motor support carried by the dredge ladder adjacent the pivotal axis of the dredge ladder, a hydraulic motor mounted on said support, said hydraulic motor having an output shaft aligned with said cutter drive shaft, said motor having a plurality of radially arranged cylinders, said motor having a cylindrical valve housing concentric with said motor output shaft at that side thereof opposite the cutter drive shaft, a rotary valve mounted in said cylindrical housing, said rotary valve being coupled to said motor output shaft for rotation therewith, a fluid inlet and fluid outlet connected to said cylindrical housing to alternatively fill and empty said motor cylinders in timed relation to said rotary valve movement and thereby directly drive said cutter, hauling machinery on said deck, a hydraulic motor to drive the hauling machinery, a power unit, first and second pumps driven by the power unit, said first pump having a volume output about twice the volume output of the second pump, said first pump output being directed to said cutter motor and said second pump output being directed to said hauling machinery motor.

9. A dredge comprising a hull having a deckhouse, a dredge ladder mounted for pivotal movement on said hull, hauling machinery enclosed under said deckhouse including a frame, a shaft mounted for rotation on said frame, a plurality of drums mounted on said shaft, cables on said drums connected to control the movement of said ladder, motor means connected to drive said shaft, an electric clutch for each drum adapted to clutch the associated drum to said shaft, each of said drums having a brake drum carried thereby, a brake band surrounding said brake drum, spring means to contract said brake bands, hydraulic cylinder and piston means to release the brake bands, an operator's control panel mounted on said hull forwardly spaced with respect to said hauling machinery and laterally with respect to said cables, said operator's control panel having switches for selectively operating said electric clutches, and control valves for operating said brakes, said deckhouse being proportioned for viewing of said hauling machinery from said control panel.

10. A dredge comprising a hull having a deckhouse, a dredge ladder mounted for pivotal movement on said hull, hauling machinery enclosed under said deckhouse including a frame, a shaft mounted for rotation on said frame, a plurality of drums mounted on said shaft, cables on said drums connected to control the movement of said ladder, motor means connected to drive said shaft, an electric clutch for each drum adapted to clutch the associated drum to said shaft, each of said drums having a brake drum carried thereby, a brake band surrounding said brake drum, spring means to contract said brake bands, hydraulic cylinder and piston means to release the brake bands, an operator's control panel enclosed under said deckhouse and spaced forwardly from said hauling machinery and laterally from said cables, said operator's control panel having switches for selectively operating said electric clutches, and control valves for operating said brakes, said deckhouse being proportioned for viewing of the hauling machinery from the control panel.

References Cited in the file of this patent

UNITED STATES PATENTS

| | | |
|---|---|---|
| 484,763 | Bowers | Oct. 18, 1892 |
| 1,551,657 | Goeriz | Sept. 1, 1925 |
| 1,913,670 | Hindes | June 13, 1933 |
| 2,461,311 | Cushing et al. | Feb. 8, 1949 |
| 2,652,035 | Bayer | Sept. 15, 1953 |
| 2,731,741 | Kaufmann | Jan. 24, 1956 |
| 2,881,882 | Gentile | Apr. 14, 1959 |
| 2,944,352 | Kaufmann | July 12, 1960 |
| 2,963,801 | Ellicott | Dec. 13, 1960 |
| 3,005,273 | Milne | Oct. 24, 1961 |

FOREIGN PATENTS

| | | |
|---|---|---|
| 1,095,540 | France | Dec. 22, 1954 |